United States Patent [19]
Kantner, Jr.; Robert F. et al.

[11] Patent Number: 5,463,701
[45] Date of Patent: Oct. 31, 1995

[54] SYSTEM AND METHOD FOR PATTERN-MATCHING WITH ERROR CONTROL FOR IMAGE AND VIDEO COMPRESSION

[75] Inventors: Robert F. Kantner, Jr., Boca Raton, Fla.; Vaughn S. Iverson, Seattle, Wash.; Kenneth Morse, South Hampton, United Kingdom; Mark A. Pietras, Boynton Beach, Fla.; Arturo A. Rodriguez, Belmont, Calif.

[73] Assignee: International Business Machines Corporation, Armonk, N.Y.

[21] Appl. No.: 183,109

[22] Filed: Jan. 18, 1994

Related U.S. Application Data

[63] Continuation of Ser. No. 963,367, Oct. 20, 1992.
[51] Int. Cl.⁶ ................................................. G09K 9/36
[52] U.S. Cl. ................ 382/166; 382/232; 382/205; 348/386; 348/420
[58] Field of Search ........................... 382/56, 17, 27, 382/34, 48; 348/384, 386, 387, 393, 396, 420

[56] References Cited

U.S. PATENT DOCUMENTS

| | | | |
|---|---|---|---|
| 5,070,532 | 12/1991 | Faul et al. | 358/433 |
| 5,109,437 | 4/1992 | Honda | 382/56 |
| 5,113,457 | 5/1992 | Enomoto et al. | 382/56 |
| 5,136,374 | 8/1992 | Jayant et al. | 358/136 |

*Primary Examiner*—Leo H. Boudreau
*Assistant Examiner*—David R. Anderson
*Attorney, Agent, or Firm*—Bernard D. Bogdon; Andrew J. Dillon

[57] ABSTRACT

Disclosed is a system and a method for compressing digitized color video data by generating codes into a pattern of tables for regions in frames of the video data exhibiting certain patterns. An image frame in a video data stream has a plurality of pixels assigned digitized color and luminance data. The image frame is divided into a plurality of non-overlapping elementary units, with each elementary unit comprising a plurality of pixels. For elementary units exhibiting change from the prior frame in time, elementary units having pixels with differing digitized color and luminance data are selected for pattern matching. Each pixel of an elementary unit selected for pattern matching is mapped to a pattern value. A pattern value is the same for all pixels sharing the same color and luminance data in an elementary unit. The pattern values are then grouped based on relative position in the elementary unit into offsets into associated sets of pattern match tables and error condition tables. The pattern match tables and error condition tables all relate to a single table of patterns. Entries from the offsets into each associated set of pattern match and error condition tables are then accumulated to generate indicia of pattern matches. The indicia are then compared to select a pattern which best matches the elementary unit within a preselected error tolerance. An offset into a table of patterns for the matched pattern is then generated to provide the desired code.

22 Claims, 9 Drawing Sheets

| comparison | M | E | E1Σ | E2Σ | MΣ |
|---|---|---|---|---|---|
| no errors | 1 | 0 | 0 | 0 | 1 |
| 1 pixel error | 1 | 1 | 1 | 0 | 1 |
| 2 pixel error | 0 | 0 | 0 | 1 | 1 |
| > 2 pixel error | 0 | 1 | X | X | 0 |

*Fig. 5*

| comparison | M | E | E1Σ | E2Σ | MΣ |
|---|---|---|---|---|---|
| no errors | 1 | 0 | 0 | 0 | 1 |
| 1 pixel error | 1 | 1 | 1 | 0 | 1 |
| no match | 0 | X | X | X | 0 |

*Fig. 8*

SYSTEM AND METHOD FOR PATTERN-MATCHING WITH ERROR CONTROL FOR IMAGE AND VIDEO COMPRESSION

This is a continuation of application Ser. No. 07/963,367, filed 20 Oct. 1992.

BACKGROUND OF THE INVENTION

1. Technical Field

The invention relates to the compression of video information for storage on and transmission among data processing systems. More particularly, the invention relates to a system and a method of matching patterns in image frames with library patterns within predetermined error tolerances.

2. Description of the Related Art

A video signal comprises a sequence of frames, which when displayed at a given minimum frame rate (e.g., 15 to 30 frames per second in a personal computer), simulate the appearance of motion to a human observer. In a personal computer system, each frame of the video image comprises a matrix of picture elements or "pixels." A common image matrix has 320 columns by 240 rows of pixels. A pixel is the minimum unit of the picture which may be assigned a luminance intensity, and in color video, a color. Depending upon the data format used, as many as three bytes of data can be used to define visual information for a pixel. A pixel by pixel color description of all pixels for an entire frame can require over two hundred thousand bytes of data.

To display a video segment, if such full frames were replaced at a frame rate of 30 frames per second, a computer could be required to recover from storage and write to video memory as many as 30 million bytes of data each second. Few contemporary mass data storage devices have both the bandwidth required to pass such quantities of data or the storage capacity to hold more than a few minutes worth of digital video information directly stored. As used here, bandwidth means the volume of data per unit time which can be recovered from an auxiliary storage device. Data compression is used to accommodate auxiliary storage devices in the storage and recovery of video segments for playback in real time and to reduce traffic on the system bus.

Data compression allows an image or video segment to be transmitted and stored in substantially fewer bytes of data than required for full frame reproduction. Data compression can be based on eliminating redundant information from frame to frame in a digitized video segment (temporal compression), or by eliminating redundant information from pixel to pixel in individual frames (spatial compression). In addition, compression may exploit superior human perception of luminance intensity detail over color detail by averaging color over a block of pixels while preserving luminance detail.

Frame differencing compression methods exploit the temporal redundancy that exists between digital video frames from the same scene recorded moments apart in time. This reduces the required data needed to encode each frame. Two successive frames from a sequence of digital video frames are compared region by region. The comparison process determines whether two corresponding regions are the same or different. The size and location of each region, the exact nature of the comparison and the definition of same and different in terms of the threshold supplied are outside the scope of this invention.

Necessarily, one frame represents a point in time after another frame. If two regions being compared are the same, then the pixels in the regions from frame N do not need to be encoded and stored if the pixels in a frame N-1 are already known. When two regions are different, the pixels in the later frame must be encoded and stored. When each region of two frames have been compared, encoded and stored, the process moves to the next pair of frames. During playback, the decompression process adds the stored information for each period to the current state of the display memory using a process that is the logical reverse of the encoding process. This is called conditional replenishment.

When there is very little temporal redundancy in a digital motion video the method fails. However, a motion video sequence of a flower growing, shot at 30 frames per second, will contain a great deal of redundancy and will compress well using conditional replenishment. Similarly a sequence recorded through a moving camera will contain little redundancy and not compress well, assuming motion compensation algorithms are not employed.

Still greater compression could be achieved, particularly for transmission, if the playback platform could access libraries of image portions to recreate an image. In such a system, the compressed data could carry a code calling on the playback platform to generate, say, a forest background. The location of the code in the compressed video stream would determine a selected set of pixel locations for the background. Regions of an image, such as forest backgrounds, brickwalls, or sand can be categorized by type and stored as combinations of color and luminance types in blocks of standardized patterns. However, lack of methods for rapid recognition of such patterns has hampered use of codes into library patterns in generating compressed video streams. Desirable is a rapid, non-memory intensive process for pattern recognition.

Were no error allowed, the comparison of a binary pattern from an image with binary pattern in a table of patterns would be straight forward. The process would loop through the table executing a comparison of patterns until a match was found or where the table was exhausted. Upon locating a match, the elementary unit is represented by an offset into the table. However, pattern matching with error tolerance is more difficult to implement. One implementation approach would be to compare the binary pattern from an elementary unit with each table entry with an exclusive OR operation. The number of 1 bits in the output of the exclusive OR operation determines the number of pixel mismatches between patterns. This output would be scanned to determine the number of pixel mismatches from the 1 bits. However, contemporary microprocessors generally lack in instruction that does the exclusive OR operation and counts the number of mismatches. Thus the process must be written to shift bits out of the resulting comparison from the exclusive OR operation one at a time. A count must be incremented when the bit shifted out has a 1 value. Such a sequence of instructions (i.e. shift, test and conditionally increment) must loop until too many bits have been tested in error, or the entire word has been tested. In contemporary machines, such a video compression process would represent an unacceptably large processing load.

Alternatively, computational burdens could be reduced by using a direct lookup table with the pattern from the elementary unit being used as an offset into the lookup table. For a four by four rectangular region this would require at lookup table of 64 kilobytes. Some specialized video hardware based upon digital signal processors does not have sufficient random access memory to support such a relatively large lookup table.

SUMMARY OF THE INVENTION

The present invention provides a system and a method for rapid recognition of patterns in raw video frames for use in compression of video segments. The invention is directed to a system and method for compressing digitized color video data by generating codes into a pattern of tables for regions in frames of the video data exhibiting patterns matching or close to those in the table. An image frame in a video data stream has a plurality of pixels assigned digitized color and luminance data. The image frame is divided into a plurality of non-overlapping elementary units, with each elementary unit comprising a plurality of pixels. For elementary units exhibiting change from the prior frame in time, those elementary units having pixels with differing digitized color and luminance data are selected for pattern matching. Each pixel of an elementary unit selected for pattern matching is mapped to a pattern value. A pattern value is the same for all pixels sharing the same color and luminance data in an elementary unit. The pattern values are then grouped based on relative position in the elementary unit to form offsets into associated sets of pattern match and error condition tables. The pattern match tables and error condition tables all relate to a single table of patterns. Entries from the offsets into each associated set of pattern match and error condition tables are then accumulated to generate indicia of pattern matches. The indicia are then compared to select a pattern which best matches the elementary unit within a preselected error tolerance. An offset into a table of patterns for the matched pattern is then generated to provide the desired code.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 is a truth table utilized by a pattern recognition process;

FIG. 8 is a truth table utilized by a second pattern recognition process;

DETAILED DESCRIPTION OF THE INVENTION

Figure 1:
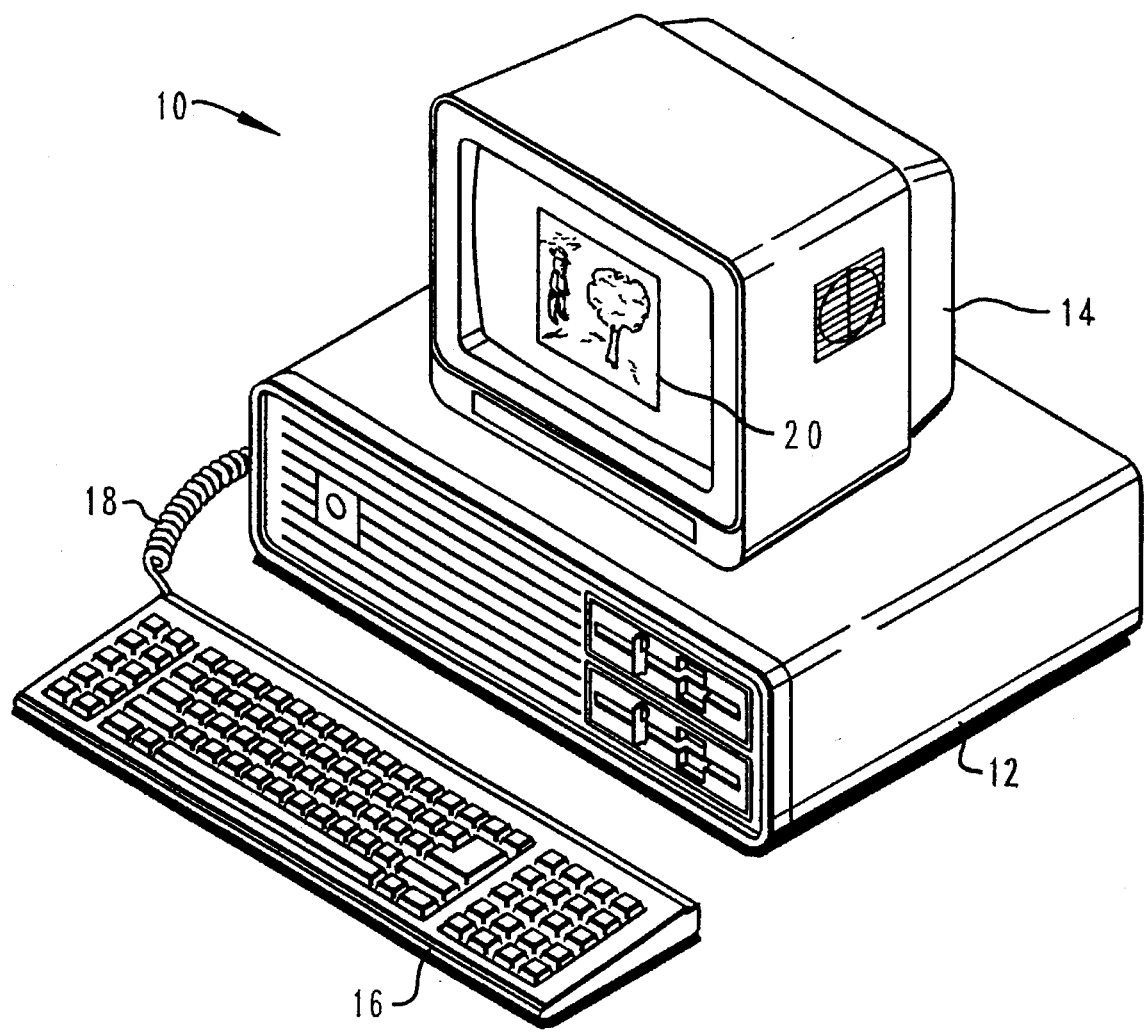
FIG. 1 is a pictorial view of a personal computer.

With reference now to the figures and in particular with reference to FIG. 1, there is depicted a pictorial representation of a personal computer system 10 which may be utilized in accordance with the method of the present invention. Personal computer system 10 includes a computer 12, preferably provided by utilizing an IBM Personal System 2 or similar system. Personal computer system 10 generally includes a video display 14 and a keyboard 16 connected to the computer by cable 18. Video display device 14 and keyboard 16 are utilized to allow user input to computer 12 and to provide user perceivable messages such as video segments 20.

Figure 2:
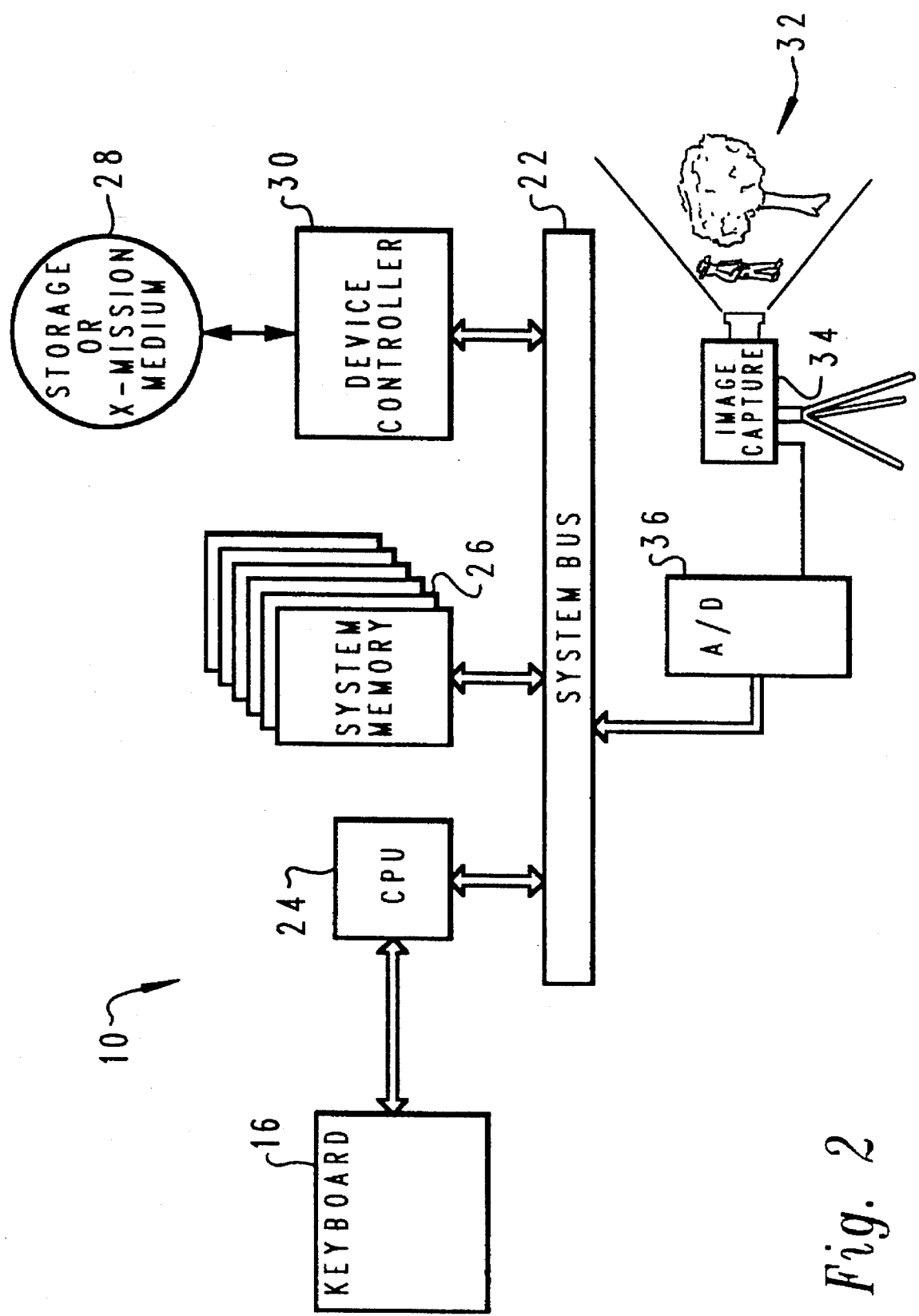
FIG. 2 is a block diagram of a data processing system for compression of video segments.

FIG. 2 is a block diagram of personal computer system 10. Computer system 10 is based on a system bus 22 on which data is passed between components of computer system 10. Among components connected to system bus 22 are a central processing unit (CPU) 24, which may be based on an Intel 80386 or more powerful microprocessor. CPU 24 executes programs stored in system memory 26 and manipulates data stored in system memory 26. A compressed video segment may be stored to a storage medium 28 or transmitted over a transmission channel through a device controller 30 connected to system bus 22. The video information is captured from a scene 32 by a camera 34, or other image generation device. An analogue to digital converter 36 converts analogue video information into a plurality of digital values (e.g. RGB24) for a raw, uncompressed sequence of frames. System 10 is preferably capable of compressing video frames on a real time basis for transmission.

Figure 3:
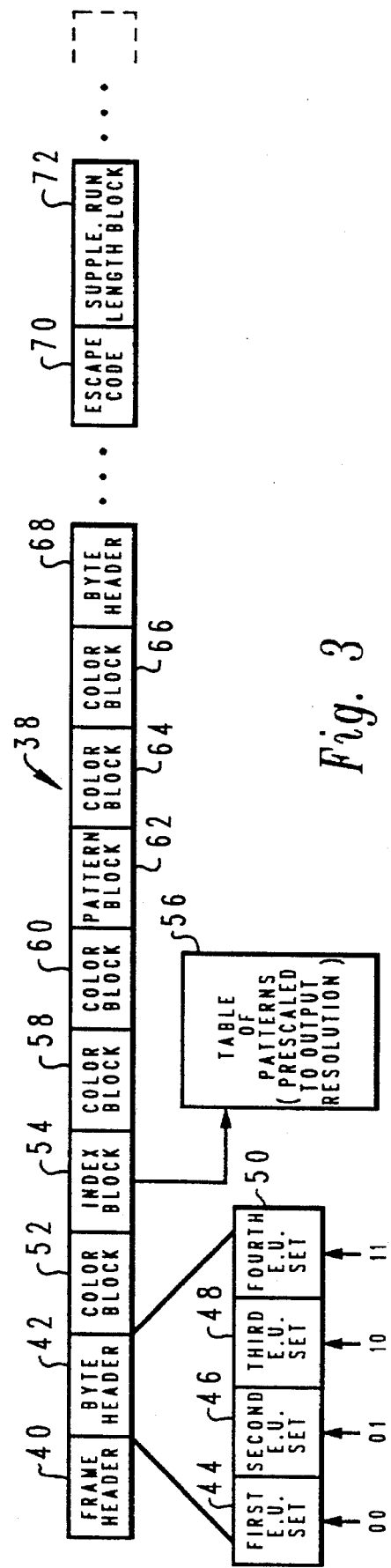
FIG. 3 is a schematic illustration of a protocol for a compressed video segment.

FIG. 3 illustrates a protocol for a compressed video data stream 38 which is encoded by the first and second embodiments of the present invention. During compression, each frame of a raw video sequence is analyzed by decomposing the frame into a plurality of non-overlapping, contiguous rectangular regions termed elementary units. Each elementary unit is a matrix of X columns by Y rows of pixels. Typically an elementary unit is a four by four matrix of pixels from a frame. The decompression platform will treat each frame as a matrix of such elementary units.

In one protocol, each elementary unit corresponds to one of four types: unchanged, homogeneous, pattern, or predetermined pattern. The type of each elementary unit is specified in the compressed video stream. Predetermined pattern type elementary units relate to library patterns in a table of patterns available on the decompression platform.

In the protocol of stream 38, elementary units are organized as quadruples which occur either: (1) sequentially in the X direction along a plurality of rows or (2) as quadrant sections of a two by two matrix. Position in the final output display is then determined by position in stream 38. Following a frame header 40 is an exemplary byte header 42 which defines a quadruple elementary unit group. Byte header 42 defines a quadruple elementary unit group. Byte header 42 includes four dyads 44, 46, 48 and 50. Each dyad can be set to one of four values from 0 to 3. Each value corresponds to one of the four elementary unit types allowed by the protocol. As illustrated, dyad 44 is set to 0, dyad 46 is set to 1, dyad 48 is set to 2 and dyad 50 is set to 3, as indicated by binary representations of those numbers. Position of a dyad in the sequence controls position of the elementary unit in the eventual display field. An unchanged elementary unit requires no video data in stream 38 and accordingly none is supplied. Thus no blocks of data in stream 38 correspond to dyad 44. Where stream 38 is used for an intraframe no dyads will have the value 0. An intraframe is a spatial compression corresponding to, for example, a change of scene.

Dyad 46 has the value 1, which indicates it corresponds to a homogeneous elementary unit. A homogeneous elementary unit is an elementary unit characterized by a single color value. Scalability of a homogeneous elementary unit is obtained by displaying the specified color over the scaled size of the elementary unit in the output display frame. Because a color must be specified for dyad 46 a color block 52 from stream 38 contains the color for dyad 46. Color may be coded either as an RGB8, an RGB16, an RGB24 format or in a YUV16 or YUV24 format. Dyad 48 corresponds to the third elementary unit of a quadruple and has been set to the value 2 which corresponds to occurrence of a predetermined pattern elementary unit. The playback platform, upon occurrence of the value 2 in a dyad, will recover the next block from stream 38, which will be an index block 54 into a table of predetermined patterns 56. The table of patterns comprises a plurality of bit maps. In each bit map bit locations have a one to one correspondence to the scale of the output video frame. The bit map has a pattern of ones and zeros which correspond to a first and second colors defined for the pattern. The playback platform will recover those colors from a color block 58 and a color block 60 and apply them respectively to the bits valued 1 and 0 in the pattern recovered from table 56.

A fourth dyad 50 is set at the value 3 which indicates that the elementary unit has a pattern block in the compressed stream 38. The playback platform recovers a pattern block 62 from the stream and two color blocks 64 and 66 respectively as output values for a scaled output elementary units. A binary pattern of pattern block 62 is ordered in a raster scan of the elementary unit.

If the table of patterns 56 is limited in number, certain entries in the table may be designated as escape codes. Subsequent to a byte header 68, occurrence of an escape code 70 in the location of an index block is indicated. Such escape codes can indicate a number of things including, run lengths of elementary units which are unchanged or homogeneous. Subsequent to the escape code block a supplemental run length block 72 may be provided.

Figure 4:
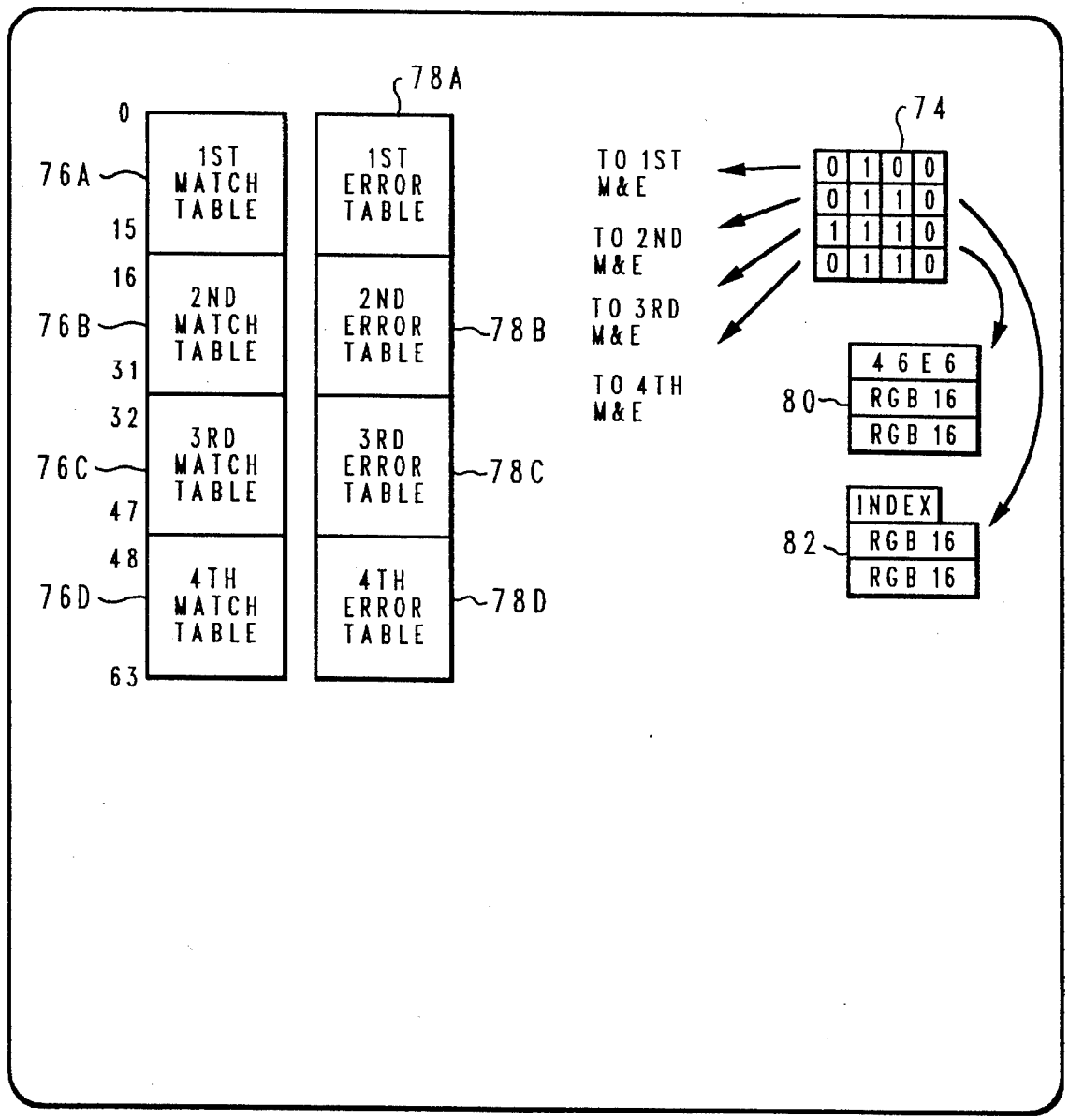
FIG. 4 is a block diagram of memory structures used in a pattern recognition process executed on a digital computer.

FIG. 4 illustrates data structures utilized to practice pattern matching in accordance with the first or second embodiment of the invention. A four by four rectangular region 74 illustrates a binary bit pattern for an encoded elementary unit in a video frame. Rectangular region 74 is encoded using two color values and a binary pattern wherein the 0 bits are associated with one of the two color values and the 1 bits with the other or remaining color value. The bits in the binary pattern are ordered in a raster scan of the elementary unit.

Specification of predetermined patterns is used to reduce the bit rate required to represent an elementary unit formed by the rectangular region 74. A table of patterns contains a set of prespecified binary patterns. Upon regeneration of an image, first and second colors recovered from a video stream may be applied to the pattern from the table of patterns to reproduce the image. Two colors are transmitted relating to the elementary unit with the first color being associated with the 0 bits of the pattern and the second color being associated with the 1 bits of the pattern. Representation of a predetermined pattern by a code rather than by the 16 bits required to represent the full pattern results in a data savings of 1 byte per elementary unit. In the present invention, predetermined pattern codes are used to represent elementary units even when exact matches are not attained with the binary patterns in the table of patterns. The number of patterns in the table of patterns is kept small to reduce the complexity of the encoding process. The complexity relates to the problems associated with pattern matching while allowing tolerance for some error. In encoding predetermined patterns we must compare the 16 bit binary pattern of an elementary unit with each pattern in the table of patterns to determine if there is a match within the tolerated error. Each comparison requires more time and makes a greater claim on available processor resources. Still, if the patterns are chosen carefully and some error is allowed, a large percentage of rectangular elementary unit regions may be encoded as codes to predetermine patterns. In the present invention up to 2 out of the 16 pixels in the rectangular region are permitted to be an error.

This patent provides a combination of lookup table techniques and microprocessor operations while allowing pixel mismatches. The number of predetermined patterns in the table of patterns is based on processor data word size (e.g. 16 bits for Intel 8086 and 80286 based machines or 32 bits for Intel 80386 and 80486 based machines). Four potential match tables 76A through 76D and four error tables 78A through 78D are provided in memory for the compression process. A four by four elementary unit is broken into four nibbles corresponding to the rows of the raster scan. Each of the four match tables 76A through 76D and error tables 78A through 78D are addressed by a corresponding nibble of the elementary unit. In other words match table 76A and error table 78A are accessed using the first nibble, and so on. The nibbles are offsets into the match tables which comprise 16 entries each. In width, the tables correspond to the data word size of the microprocessor in use.

For each nibble, all 16 predetermined patterns are checked simultaneously. In the tables, each bit position corresponds to a pattern in the table of patterns. Where the 4 bit nibble from elementary unit 74 matches to within an error of one pixel the corresponding portion of a pattern in the table of patterns, a 1 appears in the match table. Otherwise a 0 appears in the bit location. The error table is addressed in the same manner. If no errors or 2 pixel errors occur for a nibble, the error table entry will hold a 0 at a table pattern's corresponding location. Where 1 pixel error or more than 2 pixel errors occur, a 1 will hold the position in the error table. These results are summarized in a truth table set out in FIG. 5.

Upon comparison of all of the rows of elementary unit 74 to patterns through match tables 76A through 76D and error tables 78A through 78D, the information for elementary unit 74 is coded as a 6 byte block 80 comprising the pattern and the two color values if no match was found or as a 5 byte block 82 comprising an index code and two color values if a match was found.

Figure 6:
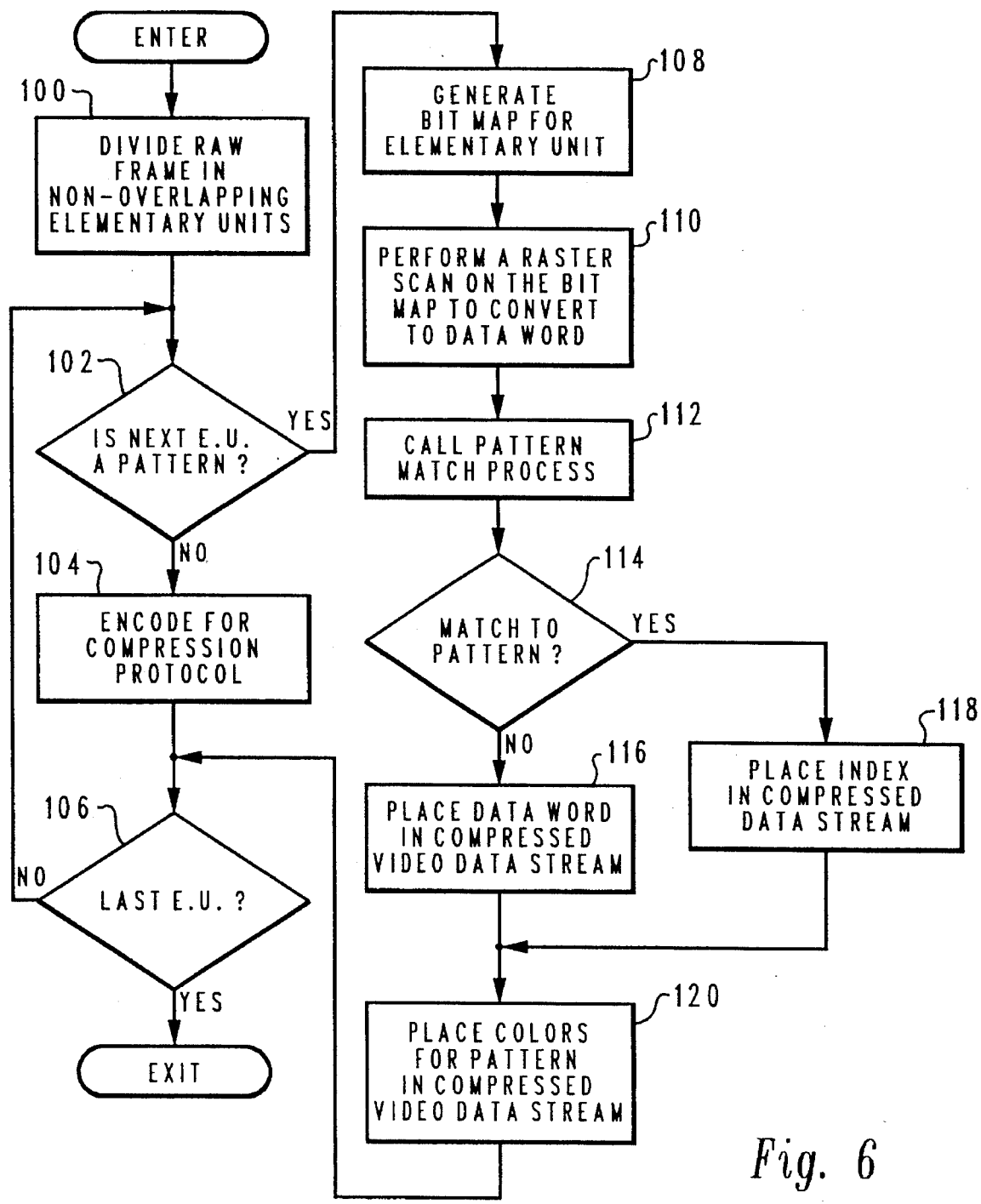
FIG. 6 is a logical flow chart of a process for preparing a video frame for a pattern recognition process.

FIG. 6 illustrates a process of preparing a video frame for coding 9 as compressed video data including codes into a table of patterns for selected portions of the frame. The process is entered at step 100 where a raw frame is divided into a plurality of rectangular, non-overlapping elementary units. Next, step 102 is executed to determine if the next (or first) elementary unit from the frame is a pattern. An elementary unit will be categorized as a pattern if it is encoded using two color values. It is assumed at this point that the elementary unit represents a change from the corresponding elementary unit in a prior frame in time. The NO branch is followed from step 102 for elementary units which are not patterns, such as homogeneous units or unchanged elementary units. Step 104 represents encoding of such elementary units in a compressed data stream in accordance with a selected protocol. The mechanics of this operation are beyond the scope of the present invention. In step 106 it is determined if the last elementary unit for a frame has been processed. If not, the process returns to step 102 to retrieve and examine the next elementary unit. Otherwise, the process is completed and exited.

The YES branch from step 102 is followed, upon identification of an elementary unit which is a pattern. Step 108 is executed to generate a bit map for an elementary unit. Because the elementary unit is characterized in two colors a 0 is applied to those pixels having one of the colors and a 1 to those pixels having the other color. Those skilled in the art will now recognize that the assignment of values to pixels of one or the other colors is arbitrary. To fully exploit the possibilities of pattern recognition, the negation of the pattern generated by step 108 must be evaluated to complete pattern matching. Match of the negation of the binary bit map requires reversal of the order of the colors in the eventual compressed data stream. Next, in step 110 the bit map is raster scanned to generate a data word. Next, in step 112, a pattern match subprocess as described below is called. The pattern match process will return indication that a match occurred or did not occur. This is determined at step 114, where if no match occurred, the NO branch is followed to step 116. In step 116 the entire data word is placed in the compressed video data stream, in accordance with the protocol in use. If step 114 detected a match, the YES branch is followed to step 118 where the index into the table of patterns is placed into the compressed video data stream in accordance with the protocol in use. Following either step 116 or step 118, step 120 is executed to place the colors for the pattern into the compressed video data stream. Step 106 is then executed to determine if the last elementary unit for a frame has been processed.

Figure 7:
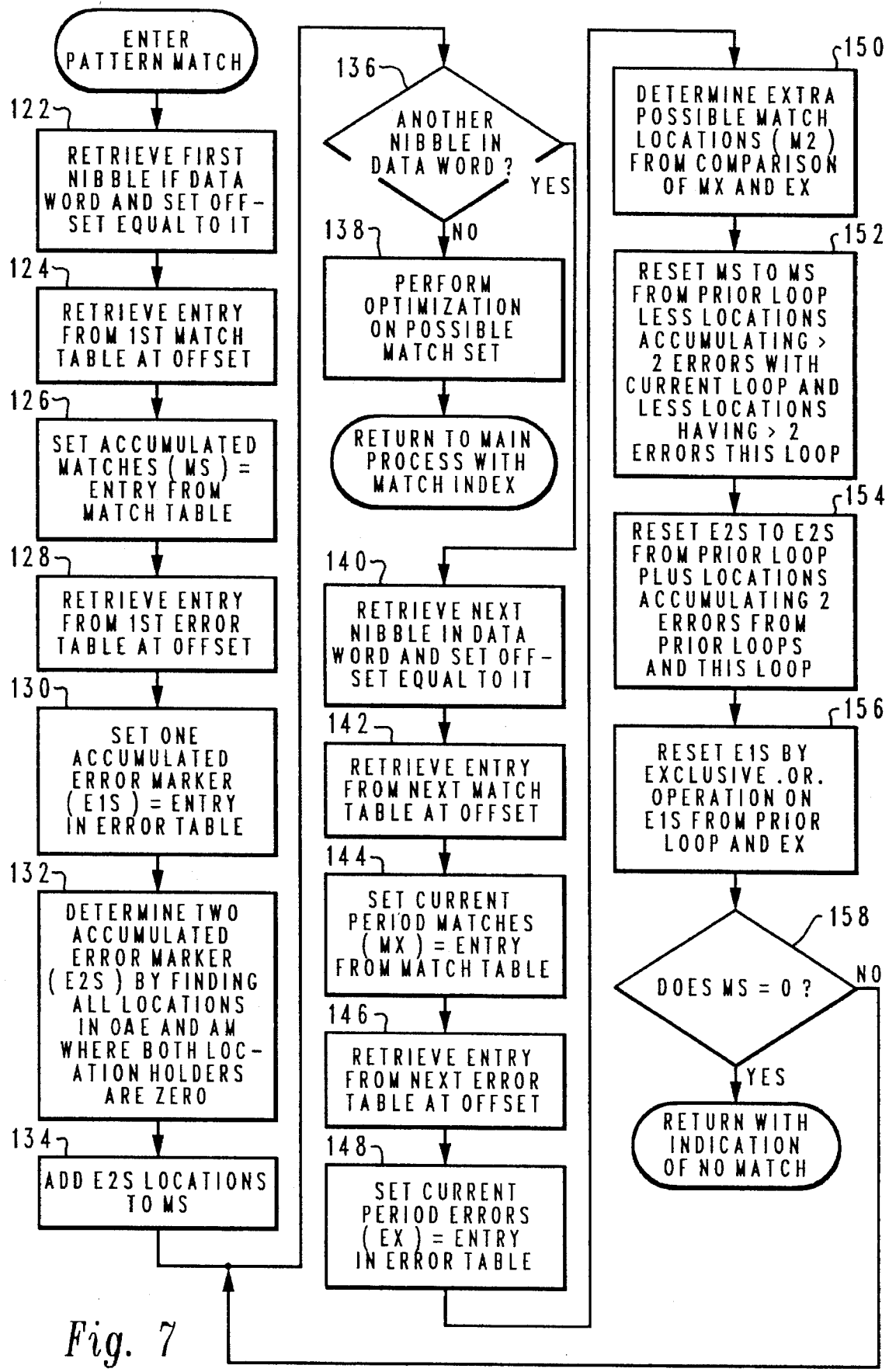
FIG. 7 is a logical flow chart of a process in accordance with a first embodiment of the invention for locating possible pattern matches for a local region of a frame of video information.

FIG. 7 illustrates a first embodiment of a process for pattern matching within elementary units. The process is entered at step 122 with retrieval of the first nibble or 4 bit segment of the bit map for an elementary unit and setting of a variable offset to the value recovered. In step 124 the offset is used to retrieve the corresponding entry from a first match table. Next with step 126, accumulated matches are set equal to the entry just retrieved from the match table. Next, in step 128, the offset is used to retrieve the corresponding entry from the first error table. In step 130 a one accumulated error marker is set equal to the retrieved entry from the error table.

Now a two accumulated error marker must be calculated using the results of steps 126 and 130. In step 132 the accumulated matches are compared to the one accumulated error marker location by location. Those locations where both bits are 0 correspond to patterns in the table of patterns which the pattern of the elementary unit match to within two errors. In step 134 the accumulated match word is reset to include locations found in step 132.

The second through fourth nibbles of the elementary unit are handled by a loop control process. As used hereafter, the first loop will be considered to be steps 122 through 134. Loop control is done in a decision step 136. At step 136 it is determined if another nibble remains for processing. If not, at least one match has been found upon comparison of all four nibbles of the elementary unit to the table of patterns. The NO branch is followed to step 138 where an optimization process is called to determine the best match. If a nibble remains for processing the YES branch is followed from step 136 to step 140.

In step 140 the next nibble is retrieved from the elementary unit and the variable offset is set to equal that value. In step 142 the offset is used to retrieve an entry from the next match table. For example, if the second nibble is being processed, the second match table is used and if the fourth nibble is being processed, the fourth match table is used. Next, in step 144, a current period matches (MX) is set equal to the retrieved entry from step 142. In step 146 the entry at the offset from the next error table is retrieved. In step 148 the variable current period errors (EX) is set equal to the retrieved entry from step 146.

Determination of those patterns where two errors are indicated is now done. In step 150, the results from steps 144 and 148 are compared to determined locations having corresponding zeros. If these locations have no errors from prior loops, the accumulated matches marker is not reset for those locations in step 152. In step 152 the accumulated matches marker is reset to equal the accumulated matches from the prior loop less locations accumulating more than two errors with the current loop and less locations having more than two errors in the current loop. Next, the two accumulated error marker is reset to equal the two accumulated error marker from the prior loop plus locations accumulating two errors in the current loop. In step 156 the one accumulated error marker is reset to the one accumulated error marker from the prior loop exclusive ORed with the current period errors value. It may be noted that values at bit locations in the one accumulated error marker and the two accumulated error marker may assume any value once the corresponding location in the accumulated match variable has gone to 0. No effort is taken to correct the variables of steps 154 and 156 where the corresponding pattern for the table of patterns cannot be a match.

Next, step 158 is executed to determine if the accumulated match marker equals 0. If it does, no pattern match can occur and the process is exited. If accumulated matches is nonzero the process is returned to step 136 to determine if another nibble in the elementary unit remains for processing. Step 158 may also be executed following step 134.

Table 1 illustrates the pattern matching process as a step of logical operations. In the table $\Sigma$ corresponds to S in the flowcharts. Accordingly, $M\Sigma$ equals accumulated matches, $E1\Sigma$ equals the one accumulated error marker, and $E2\Sigma$ equals the two accumulated error marker. In addition, temporary variables MX, EX and M2 are used.

TABLE 1

Figure 9:
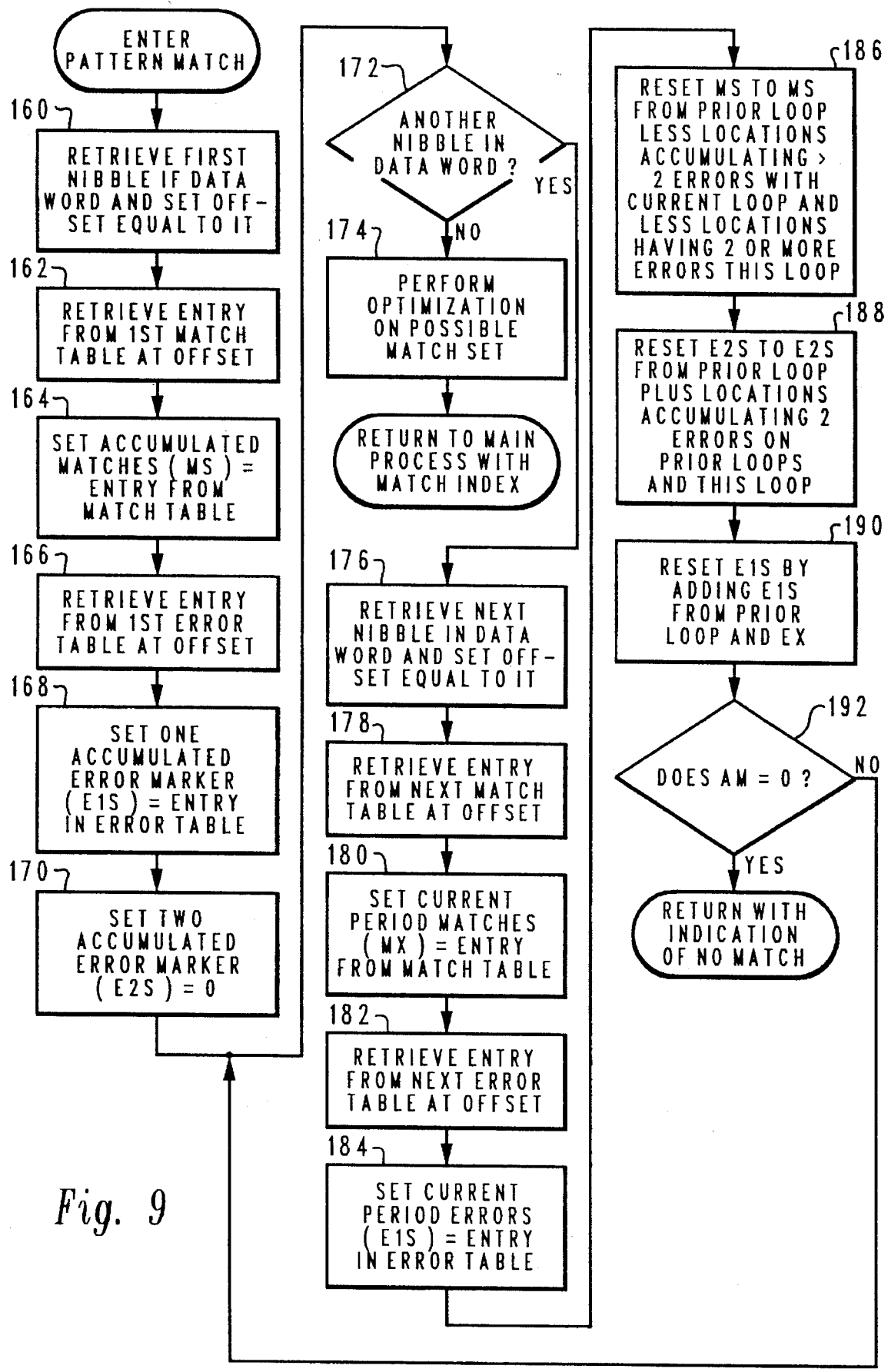
FIG. 9 is a logical flow chart of a process in accordance with a second embodiment of the invention for locating possible pattern matches for a local region of a frame of video information.

//Loop for nibble 1(n=0)
$M\Sigma_0 = M_0[N_0]$
$E1\Sigma_0 = E_0[N_0]$
$E2\Sigma_0 = {}^-(M_0[N_0] + E_0[N_0])$
$M\Sigma_0 = M\Sigma_0 + E2\Sigma_0$
//Loops for nibbles 2–4 (ie. n=1,2,3)
$MX = M_n[N_n]$
$EX = E_n[N_n]$
$M2 = {}^-\{MX + EX\}$
$M\Sigma_n = M\Sigma_{n-1} \cdot ((MX \cdot ({}^-EX + (EX \cdot {}^-E2\Sigma_{n-1}))) + ((M2 \cdot {}^-(E1\Sigma_{n-1} + E2\Sigma_{n-1}))))$
$E2\Sigma_n = E2\Sigma_{n-1} + (EX \cdot E1\Sigma_{n-1}) + M2$
$E1\Sigma_n = EX \cdot \text{xor} \cdot E1\Sigma_{n-1}$
//end loop The process may be further simplified with slightly less tolerance to pixel error if the procedure does not allow two pixels to be in error within the same nibble of a binary pattern. Two pixel errors in total would still be allowed, provided they occur in different nibbles of the elementary unit. Such an abbreviated process uses the truth table of FIG. 8 wherein an X represents a don't care value. The pattern match process is illustrated in FIG. 9 and is entered at step 160 where first nibble of a data word is retrieved and an offset is set equal to it. In step 162 an entry from the first match table at the offset is retrieved. In step 164 the accumulated matches variable is set equal to the retrieved entry from the match table. In step 166 the offset is used to retrieve an entry from the first error table. In step 168 a one accumulated error marker is set equal to the retrieved entry from the error table. In step 170 a two accumulated error marker is initialized with the value of 0.

At this point loop control for the remaining three nibbles from the elementary unit begins. Step 172 provides determination of whether another nibble remains from the elementary unit for processing. If not step 174 is executed to call an optimization process on the possible match set.

If another nibble remains for processing, the YES branch is followed from step 172 to step 176. In step 176 the next nibble is retrieved from the elementary unit and offset is set equal to the nibble. Next, step 178 is executed to retrieve the entry from the match table corresponding to the current loop at the offset. Next, in step 180, the variable for current period matches is set equal to the retrieved entry from the match table. In step 182 the offset is used to retrieve an entry from the error table corresponding to the current loop. In step 184, a current period error variable is set equal to the retrieved entry from the error table.

In step 186 the accumulated errors variable is set equal to the accumulated errors variable from the prior loop less locations accumulating more than two errors with the current loop and less locations having two or more errors in the current loop. In step 188, the two accumulated errors variable is reset to equal the two accumulated error variable from the prior loop plus locations accumulating two errors over prior loops and the current loop. Next, step 190 is executed to reset one accumulated error variable 18 by adding the one accumulated error variable from the prior loop and the current period error variable retrieved from the error table using the offset. In step 192 it is determined if the accumulated match variable equals 0. Again as in FIG. 7, step 192 could also follow step 170. The NO branch from step 192 returns processing to step 172. The YES branch from step 192 is taken when no matches within the error tolerance have been found.

The logical operations executed by the process of FIG. 9 are set forth by the logical relations listed in Table 2:

```
// Loop for nibble 1(n = 0)
MΣ₀ = M₀[N₀]
E1Σ₀ = E₀[N₀]
E2Σ₀ = 0
// Loops for nibbles 2–4 (ie. n = 1, 2, 3)
MX = Mₙ[Nₙ]
EX = Eₙ[Nₙ]
MΣₙ = MΣₙ₋₁ · MX · (¯(EX · E2Σₙ₋₁))
E2Σₙ = E2Σₙ₋₁ + (EX · E1Σₙ₋₁)
E1Σₙ = EX + E1Σₙ₋₁
// end loop
```

At the normal conclusion of the pattern matching processes the accumulated match variable (ME) contains the potential pattern matches and E1Σ and E2Σ indicate 1 and 2 pixels in error respectively at these locations corresponding to patterns from the table of patterns still under consideration. At this point, the best candidate pattern may have to be selected. More than one pattern may have qualified as a match. The offset into the table of patterns will be set to correspond to the bit position for the match having the fewest errors. Screening is done to avoid selecting a pattern that is an error by two pixels over a pattern that might be an exact match or have only one pixel in error. The first check done determines if any patterns were an exact match. This is accomplished by executing the logical operation:

$$M\Sigma \bullet \overline{(E1\Sigma + E2\Sigma)} \tag{1}$$

If the result from this operation is nonzero, the result is used as the input to a bit scanning function. Only one pattern can be an exact match. If the result is 0, there were no exact matches in the table of patterns. The procedure then must test to distinguish any patterns with a single pixel error as against two pixel error. The logical operation is:

$$M\Sigma \bullet \overline{(E2\Sigma)} \tag{2}$$

If the result of the above operation is nonzero, the result is used as an input to the scanning function. The output of the scanning function will be a pattern index from the entry in the table of patterns that represents a binary pattern with a single pixel in error. If the result is 0, then the forgoing process is found a pattern with two pixels in error. The unmodified MΣ may be scanned to determine an index into the pattern.

Figure 10:
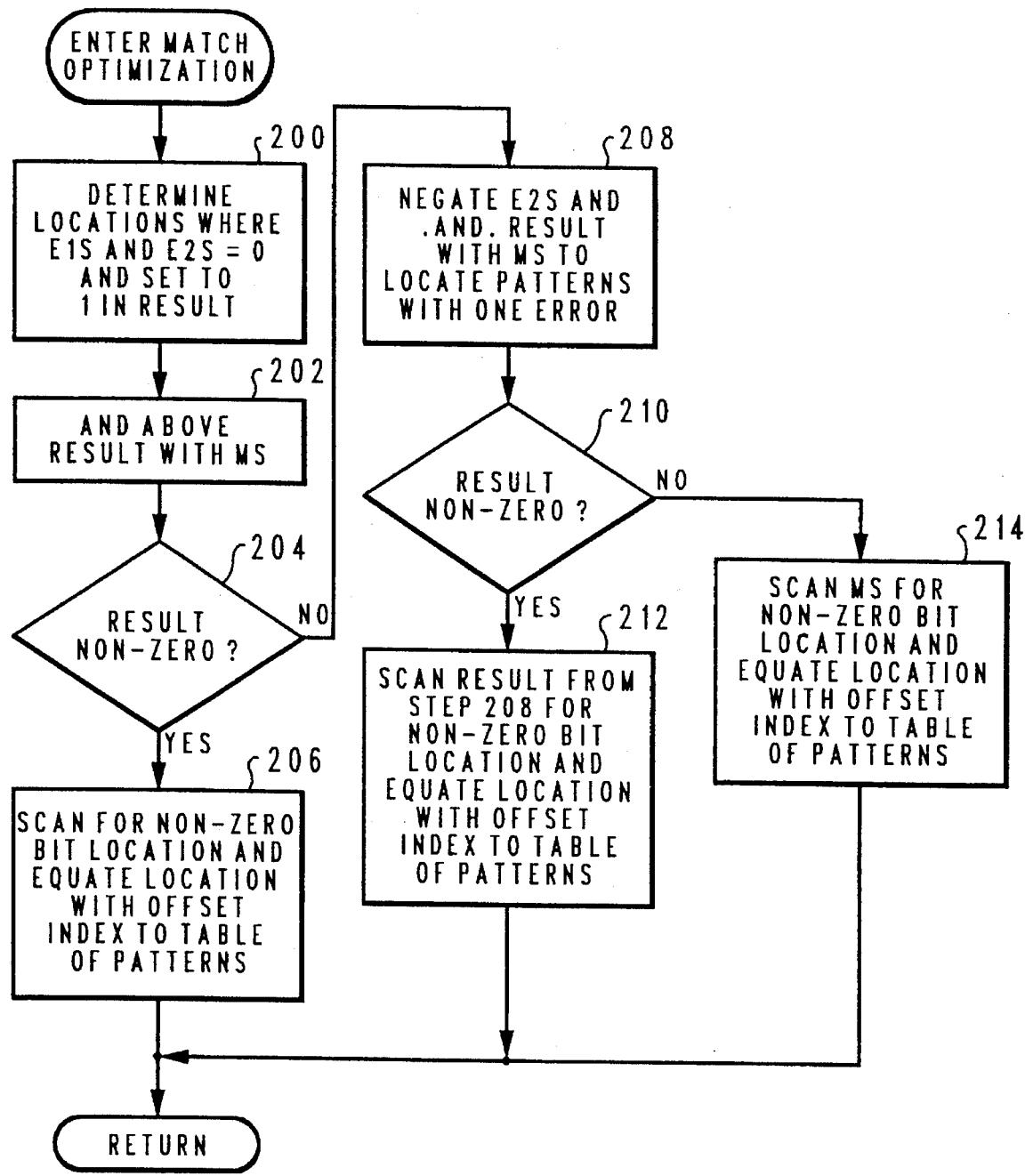
FIG. 10 is a logical flow chart of a process for selecting one of a plurality of pattern matches located by the processes of FIGS. 7 or 9.

FIG. 10 illustrates a logical process for executing the logical steps of equations one and two. Optimization is entered with execution of step 200 where locations in the one accumulated error variable and two accumulated error variable are compared to determine if any corresponding location in the variables both have entries equal to 0. If so a result word is set to 1 at the corresponding location. Next, step 202 is executed to perform a logical AND on the result from step 200 and the accumulated match variable. If the result of this operation of step 202 is nonzero it is detected at step 204. A nonzero result implies that an exact match was obtained. The YES branch is followed from step 204 to step 206 where the result of the operation of step 202 is scanned for the nonzero bit location. Once found the location is used to generate an offset into the pattern of tables and this offset is returned to the encoding control process of FIG. 6.

A zero result from step 202 results in the NO branch from step 204 being taken to step 208. In step 208 the two accumulated error variable is negated and the result of the negation-is used as an input to an AND operation with the accumulated matches variable. In step 210 the result of the operation of step 208 is compared to 0. If the result is nonzero the YES branch is followed to step 212. In step 212 the result of the operations of step 208 is scanned to locate the bit location which is nonzero. This bit location is then correlated to an offset into the table of patterns and returned to the process of FIG. 6 for encoding. If in step 210 a 0 result was found, the NO branch from step 210 is followed to step 214. In step 214 the unmodified accumulated match variable is scanned to the location having a nonzero result. This location will give the offset into the table of patterns as in step 212 and step 206.

In practice, with a limited number of patterns, the patterns are selected with a minimum hamming distance of 4. This makes checking for best fit unnecessary. Only one pattern can be an exact match or only one pattern will be matched to an error tolerance of one, or only one pattern will be matched to an error tolerance of two. This shortens the procedure to a simple scan of the accumulated match value after completion of all four nibbles of an elementary unit.

While the invention has been particularly shown and described with reference to a preferred embodiment, it will be understood by those skilled in the art that various changes in form and detail may be made therein without departing from the spirit and scope of the invention.

What is claimed is:

1. A method within a data processing system of compressing an image frame having a plurality of pixels assigned digitized color and luminance data, the method comprising the data processing system implemented steps of:

dividing the image frame within said data processing system into a plurality of non-overlapping elementary units, each elementary unit comprising a plurality of pixels;

retrieving an elementary unit having pixels with differing digitized color and luminance data for pattern matching;

assigning each pixel of a retrieved elementary unit a pattern value, which is the same for all pixels sharing a color and luminance value in the elementary unit;

providing a sequence of associated sets of pattern match and error condition tables within said data processing system;

grouping pattern values into offsets into each associated set of pattern match tables and error condition tables;

accumulating entries from the offsets into each associated set of pattern match and error condition tables to generate indicia of pattern matches;

comparing the indicia from the accumulating step to locate a pattern which best matches the pattern value assignments for the elementary unit within a preselected error tolerance;

generating a code for inclusion in a compressed video stream identifying the pattern and including the color and luminance values for the retrieved elementary unit; and storing said compressed video stream.

2. A method of compressing an image frame having a plurality of pixels assigned digitized color and luminance data as set forth in claim 1, wherein the pattern values are independent of the digitized color and luminance data from elementary unit to elementary unit.

3. A method of compressing an image frame having a plurality of pixels assigned digitized color and luminance data as set forth in claim 2, wherein the step of retrieving an elementary unit having pixels with differing digitized color and luminance data comprises:

first determining if an elementary unit has pixels quantized to each of two color and luminance data values;

wherein responsive to an affirmative determination that an elementary unit has pixels of two color and luminance data values, retrieving the elementary unit for pattern matching.

4. A method of compressing an image frame having a plurality of pixels assigned digitized color and luminance data as set forth in claim 3, wherein the step of mapping each pixel of a retrieved elementary unit to a pattern value results in a binary bit map of the elementary unit, wherein one value identifies pixels having a first color and luminance data value and another value identifies pixels having a second color and luminance value.

5. A method of compressing an image frame having a plurality of pixels assigned digitized color and luminance data as set forth in claim 4, wherein the step of providing a sequence of associated sets of pattern match and error condition tables further comprises:

providing, for each associated set of pattern match and error condition tables, one pattern match table and one error condition table wherein each pattern match table and error condition table is one word in width; and associating a location in each word in the pattern match tables and the error condition tables with a pattern in a table of patterns.

6. A method of compressing an image frame having a plurality of pixels assigned digitized color and luminance data as set forth in claim 5, wherein the step of accumulating entries is done for all patterns concurrently.

7. A method of compressing an image frame having a plurality of pixels assigned digitized color and luminance data as set forth in claim 6, and further comprising:

processing a plurality of image frames from a digitized video segment in a time ordered sequence;

wherein the step of retrieving an elementary unit having pixels with differing digitized color and luminance data for pattern matching includes only those elementary units which changed from a next prior image frame in the time ordered sequence.

8. A data processing system for compressing an image frame having a plurality of pixels assigned digitized color and luminance data, comprising:

a memory;

means for making a sequence of associated sets of pattern match and error condition tables in the memory;

means for dividing an image frame into a plurality of non-overlapping elementary units, each elementary unit including a plurality of pixels;

means for retrieving an elementary unit having pixels with differing digitized color and luminance data for pattern matching;

means for assigning each pixel of a retrieved elementary unit a pattern value, the pattern value being the same for all pixels sharing a color and luminance value in the elementary unit;

means for grouping the pattern values into offsets into each associated set of pattern match tables and error condition tables;

means for accumulating entries from the offsets into each associated set of pattern match and error condition tables to generate indicia of pattern matches;

means for comparing the indicia to locate a pattern which best matches the elementary unit within a preselected error tolerance;

means for generating a code for inclusion in a compressed video stream identifying the pattern and for adding color and luminance values for the retrieved elementary unit; and means for storing said compressed video stream within said memory.

9. A data processing system for compressing an image frame having a plurality of pixels assigned digitized color and luminance data as set forth in claim 8, wherein the pattern values are independent of the digitized color and luminance data from elementary unit to elementary unit.

10. A data processing system for compressing an image frame having a plurality of pixels assigned digitized color and luminance data as set forth in claim 9, wherein the means for retrieving an elementary unit having pixels with differing digitized color and luminance data comprises:

means for determining if an elementary unit has pixels quantized to each of two color and luminance data values;

wherein the means for retrieving the elementary unit for pattern matching is responsive to an affirmative determination that an elementary unit has pixels of two color and luminance data values.

11. A data processing system for compressing an image frame having a plurality of pixels assigned digitized color and luminance data as set forth in claim 10, wherein the means for mapping each pixel of a retrieved elementary unit to a pattern value results in a binary bit map of the elementary unit, wherein one value identifies pixels having a first color and luminance data value and another value identifies pixels having a second color and luminance value.

12. A data processing system for compressing an image frame having a plurality of pixels assigned digitized color and luminance data as set forth in claim 11, wherein the means for making a sequence of associated sets of pattern match and error condition tables further comprises:

means for providing, for each associated set of pattern match and error condition tables, one pattern match table and one error condition table wherein each pattern match table and error condition table is one word in width;

wherein a location in each word in the pattern match tables and the error condition tables is associated with a pattern in a table of patterns.

13. A data processing system for compressing an image frame having a plurality of pixels assigned digitized color and luminance data as set forth in claim 12, wherein the means for accumulating entries operates on all patterns concurrently.

14. A data processing system for compressing an image frame having a plurality of pixels assigned digitized color and luminance data as set forth in claim 13, and further comprising:

means for processing a plurality of image frames from a digitized video segment in a time ordered sequence;

wherein the means for retrieving an elementary unit having pixels with differing digitized color and luminance data for pattern matching retrieves only those elementary units which changed from a next prior image frame in the time ordered sequence.

15. A digital image processing system comprising:

means for capturing an image frame;

means for digitizing the image frame;

a data storage system;

a plurality of spatial pattern definitions stored in the data storage system;

a plurality of codes, associated one for one with spatial pattern definitions, stored in the data storage system;

a plurality of associated sets of pattern match and error condition tables in the data storage system;

means for extracting spatial sections from the digitized image frame;

a processing unit for converting a spatial section into a spatial code indicating areas of like colors and luminance levels in the spatial section;

means for retrieving the plurality of associated sets of pattern match and error condition tables;

the processing unit further providing for comparing the spatial code and the spatial pattern definitions for matches and near matches;

means responsive to occurrence of a match or near match of the spatial section with a spatial pattern definition for replacing the spatial section in the digitized frame with the code associated with the spatial pattern definition; and means for storing the digitized frame thus modified within the data storage system.

16. A digital image processing system as set forth in claim 15, wherein the means for replacing further provide for appending data defining colors and luminance values for the spatial section.

17. A digital image processing system as set forth in claim 16, wherein the spatial pattern definitions cover an array of pixels in which groups of pixels correspond to areas of like color and luminance values.

18. A digital image processing system as set forth in claim 16, wherein the processing unit further includes:

means for grouping the spatial code for a digitized image frame into offsets into each of the plurality of associated sets of pattern match tables and error condition tables;

means for accumulating entries from the offsets into each associated set of pattern match and error condition tables to generate indicia of pattern matches;

means for comparing the indicia to locate a spatial pattern definition which best matches the elementary unit within a preselected error tolerance.

19. A digital image processing system as set forth in claim 16, further comprising:

a plurality of predefined categories for spatial sections including homogeneous, predetermined pattern and unpredetermined pattern; and means for determining if the spatial section is homogeneous;

means responsive to the spatial section being homogeneous for replacing the spatial section with a data block for color and luminance level;

means for determining if the spatial section is a unpredetermined pattern; and means responsive to the spatial section being a unpredetermined block for replacing the spatial section with a data block for the pattern of the spatial section and appending thereto colors and luminance levels data.

20. A digital image processing system as set forth in claim 19, wherein the image frame is captured as part of a sequence of frames and wherein the plurality of predefined categories for spatial sections further include unchanged spatial sections, which are deleted from the image frame.

21. A digital image processing system as set forth in claim 20, and further comprising:

means for marking locations and categories of spatial sections in the digitized image frame.

22. A method of coding a digitized image frame in data block sequence, comprising:

placing a frame header at the beginning of the data block sequence;

indicating spatial position for groups of elementary units of the digitized frame by the position in the data block sequence of a group header;

categorizing the elementary units of the group through the group header as unchanged, homogeneous, predetermined pattern or unpredetermined pattern;

for any elementary unit categorized as homogeneous, appending color and luminance information to the group header;

for any elementary unit categorized as being a predetermined pattern, appending a index to a library pattern and color and luminance values for the elementary unit to the group header;

for any elementary unit categorized as being a unpredetermined pattern, appending a pattern block and colors and luminance values for the elementary unit to the group header; and storing the group header and appendages.

* * * * *